United States Patent [19]

Stenkvist

[11] 4,161,618

[45] Jul. 17, 1979

[54] DC ARC FURNACE OPERATION INDICATING SYSTEM

[75] Inventor: Sven-Einar Stenkvist, Vesteras, Sweden

[73] Assignee: ASEA Aktiebolag, Vesteras, Sweden

[21] Appl. No.: 880,149

[22] Filed: Feb. 22, 1978

[30] Foreign Application Priority Data

Feb. 22, 1977 [SE] Sweden .................................. 7701913

[51] Int. Cl.² .......................................... H05B 7/148
[52] U.S. Cl. ...................................................... 13/12
[58] Field of Search .......................... 13/9, 11, 12, 13

[56] References Cited

U.S. PATENT DOCUMENTS

| | | | |
|---|---|---|---|
| 3,835,230 | 9/1974 | Valchev et al. | 13/9 |
| 3,868,473 | 2/1975 | Dimick | 13/13 |

*Primary Examiner*—R. N. Envall, Jr.
*Attorney, Agent, or Firm*—Kenyon & Kenyon

[57] ABSTRACT

A DC arc furnace operation indicating system provides an indication and possibly a signal or control when during start-up the starting electrode does not make good electrical contact with a furnace charge of solid metal pieces and also thereafter when the shift is made to the melt electrode and it is not in a good electrical connection with the melt after the starting electrode is inactivated preparatory to the furnace going into normal production operation.

4 Claims, 2 Drawing Figures

DC ARC FURNACE OPERATION INDICATING SYSTEM

BACKGROUND OF THE INVENTION

A DC arc furnace usually operates with a cathodic graphite or Soderberg type arcing electrode with the charge in the furnace hearth functioning as the anode and heated by the arc. It is necessary to transmit the electric power through the charge, arc, and arcing electrode, requiring an electrical power connection with the charge.

Normally the furnace is charged initially with solid metal pieces, exemplified by steel scrap, and during start-up a movable starting electrode connected to the power circuit is pressed against the charge to provide the electrical connection. After melting to a degree forming a pool of melt of adequate depth, the electrical connection is made via a melt electrode in the form of a metal bar encased by refractory with its inner end exposed to the melt and its outer end externally exposed and connected to the power circuit.

When the arcing electrode is cathodic, it is connected with a negative power line while the starting and melt electrodes are connected together to a positive line. For power both lines are connected to the appropriate poles of the DC power supply which is normally an inverter for AC current.

As the forming melt contacts the inner end of the melt electrode, the starting electrode is withdrawn so that it is not damaged, it being normally made of metal at least mainly and not being intended for use other than the start-up. The melt electrode is also made of metal but it is designed so that although its inner end and a portion extending from that end become molten, its outer end and a portion extending inwardly from that end are maintained in an unmelted state by adequate cooling of the refractory encasing the bar and cooling of the bar's outer end. The bar can be made of a metal compatible with that of the charge in the furnace; in the case of a steel charge the bar can be made of steel of generally corresponding analysis.

Some of the details of the start-up and then production operation of a DC arc furnace are described by the Valchev et al. U.S. Pat. No. 3,835,230, Sept. 10, 1974, although the details of a workable melt electrode are not disclosed there. Such details are disclosed by the Stenkvist U.S. Pat. No. 3,997,712, Dec. 14, 1976, and by the Andersson Application Ser. No. 744,423, filed Nov. 23, 1976, as a continuation-in-part of application Ser. No. 634,061 filed Nov. 21, 1975 (since abandoned), the Stenkvist patent and Andersson application both being assigned to the assignee of the present invention.

In the Valchev et al. patent switches are used to switch the power off from the starting electrode and on the melt electrode at the appropriate time; it is also possible to keep both electrodes connected together to, for example, the positive power line, because after the melt electrode is in good contact with the melt the starting electrode need only be removed, the current then commutating automatically to the melt electrode.

The present inventor has concerned himself with the problem that if the starting electrode does not make a good electrical contact with the initially charged metal pieces or scrap, an arc is formed between the starting electrode and the charge as the starting electrode transmits the power to the charge. This causes undesirable rapid wear of the starting electrode, and the consumption of power where such consumption is not desired.

Of even more importance, if the starting electrode is withdrawn before the formation of a melt of sufficient depth to make a good contact with the melt electrode, overheating and possibly the formation of an arc between the melt and the melt electrode can occur, such as between the inner end of the melt electrode and the inadequately formed melt. This may also occur even if the melt depth is adequate for a good electrical contact with the melt electrode, if the furnace is tilted too early for slag removal, an electric arc furnace normally being a tilting furnace. Such possible arcing between an inadequate melt and the starting electrode can cause heavy wear on the refractory encasing the melt electrode, possibly requiring a shutdown of the furnace for repair of this refractory. Once the starting electrode is removed from the charge, the melt electrode must carry all the power, emphasizing the necessity for a good electrical contct with the melt and the risk of rapidly wearing or possibly destroying the melt electrode's refractory if arcing occurs because of a poor contact.

SUMMARY OF THE INVENTION

With the foregoing in mind, the present invention is based on the realization that although an electric furnace hearth which contains the charge is normally a non-metallic refractory, such as being layed-up from the usual refractory bricks, its outside surface acquires an electrical charge of the same polarity as the starting and melt electrodes, depending on which is in contact with the charge, when the power is on, and that this charge has a voltage differing from that of the power line connecting with these electrodes depending on which of the electrodes is in use and whether or not a good electrical connection exists. Conventionally, the outside of the furnace hearth is encased by a steel shell as is the furnace side wall and which shell via the metal parts supporting the furnace is grounded. In other words, a voltage differential exists between the power line connecting with the starting and melt electrodes and ground. When either of the electrodes is in good electrical contact with the charge, what can be called a normal voltage differential exists between ground and the power line connected with the two electrodes, and when there is a poor electrical contact between either of the electrodes and the charge, the voltage differential increases in value, or in other words, the ground voltage increases substantially above a normal value.

This realization, in turn, lead to the present invention which is characterized by providing a means for measuring the voltage differential between ground and one or the other of the two electrodes which may be relied on at any particular time.

For example, when the electrodes are connected to the positive power line, the voltage difference between this line and ground provides an indication of whether or not the one of the electrodes in use is making a good electrical contact with the charge. For example, during start-up, when the starting electrode is pressed against the metal pieces or scrap, a poor contact is indicated by an increase in the voltage on the outside of the hearth, such as its steel shell, relative to the positive power line, and if this is found to be so, measures can be taken to obtain a good contact as by increasing the pressure with which the starting electrode is pressed against the charge. When in due time the melt electrode is relied on, an increase in the voltage differential indicates that the starting electrode should promptly be returned to its charge-contact position so that possible destruction of the melt contact construction can be prevented.

A suitably sensitive volt meter can be used to measure the voltage differential but preferably an adequately sensitive relay has its actuator connected between ground and the power line for the starting and melt electrodes so that electrical relay contacts can be closed or opened to control an electric circuit which can be used to cut off all power to the electric furnace before damage can occur to the starting or melt electrodes as the case may be, if a poor contact is indicated.

BRIEF DESCRIPTION OF THE DRAWINGS

A specific example of the present invention is schematically illustrated by the accompanying drawings in which:

FIG. 1 shows the essential components of a DC electric arc furance, while

DETAILED DESCRIPTION OF THE INVENTION

Figure 1:
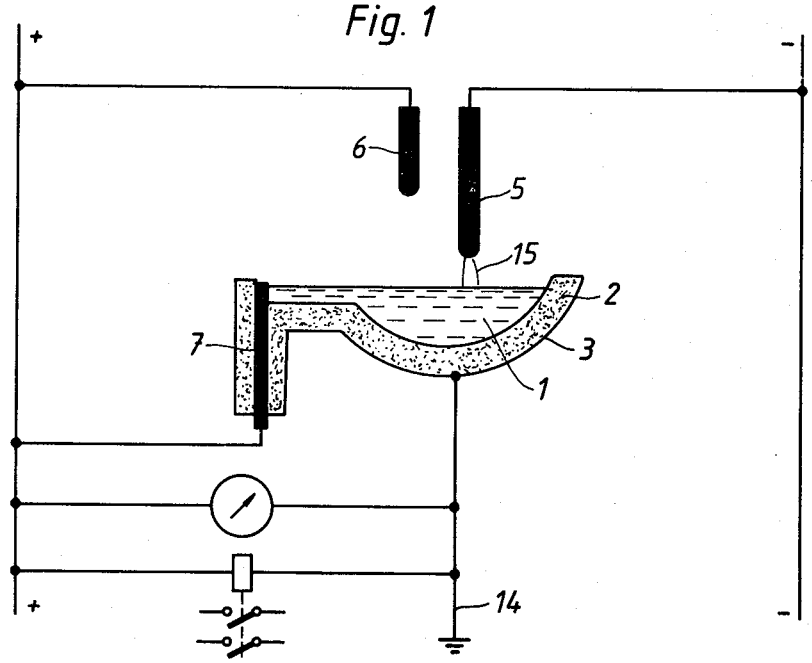
Figure 2:
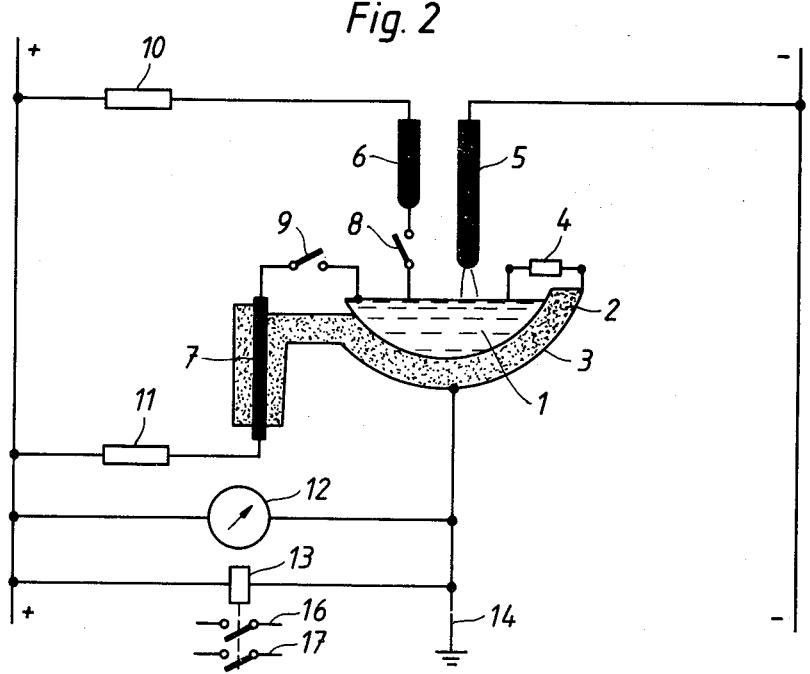
FIG. 2 shows the same components but with the switching and electrical resistance relations between the various parts diagrammatically represented.

Having reference to the above drawings, FIG. 1 shows the essential components of a DC electric arc furnace as comprising the refractory hearth 2 externally supported by the usual steel shell 3 and adapted to contain the melt 1. As shown diagrammatically by FIG. 2, an electric resistance 4 exists between the melt 1 and the outside of the hearth as represented by its shell 3. This resistance 4 represents the electric resistance between the melt 1 and the outside or shell 3 of the hearth.

The arcing electrode 5 is shown as operating cathodically, it being connected to the schematically represented negative power line. The starting electrode 6 and the melt electrode 7 are both connected to the schematically illustrated positive power line. Although not shown, these power lines connect with the positive and negative poles of the usual rectifier powered by AC.

The initially charged metal pieces such as steel scrap, are not illustrated but it is to be understood that the diagrammatically represented switch 8 is intended to show that when the starting electrode 6 is in good electrical contact the switch 8 is, in effect, closed, it being opened in the event such good electrical contact does not exist. Likewise, the diagrammatically shown switch 9 represents when closed a good electrical contact between the melt 1 formed from the solid pieces and the melt electrode 7; the switch 9 is, in effect, open when such good electrical contact does not exist as, for example, before the melt 1 is inadequately formed to contact the inner end of the melt electrode or if the furnace is tilted prematurely for slag removal. 10 is supposed to represent the line resistance existing in the starting electrode power connections while 11 is the same excepting that it applies to the resistance in the case of the melt electrode 7.

Both figures of the drawing show the volt meter 12 connected between the positive power line and the furnace shell 3 and, therefore, the outside of the refractory hearth 2, while 13 represents a relay solenoid which is correspondingly connected, both the volt meter and relay solenoid being connected between the positive power line and ground which is indicated at 14. This ground connection may be a positive connection with the furnace shell 3 as contrasted to relying on the fact that this shell is inherently grounded in the case of an operating electric arc furance.

To show that the furnace is in operation, the arc 15 is indicated in both figures, this being formed between the arcing electrode 5 and either the unillustrated solid pieces or scrap or the illustrated melt 1, as the case may be. The relay is shown as having contacts 16 and 17 which either close or open, depending on the relay design and the circuitry to be controlled, depending on whether a sufficient voltage differential exists between the positive power line and the ground 14 to actuate the relay solenoid 13.

It is to be understood that the resistances 4, 10 and 11 and the switches 8 and 9 are not actual elements in the case of the usual electric arc furnace, and are shown only to indicate the various conditions that prevail. They do serve to show the manner in which the present invention works which is as follows:

When the hearth 2 is initially charged with the unillustrated solid pieces of scrap and power is on the power lines via the inverter, the starting electrode 6, which is normally vertically movable, is lowered and pressed against the solid pieces which are normally in a pile; the arcing electrode 5 is lowered and then lifted to the extent required to strike the arc 15 so that a meltdown is started. If the starting electrode 6 forms a good electrical contact with the solid pieces or scrap, the switch 8 is, in effect, closed and a normal voltage charge is on the outside 3 of the hearth. The voltage differential then depends on the resistance 4 which represents the resistance between the inside and outside of the hearth, and the resistance 10 which represents resistance of the power line leading to the starting electrode 6. This normal voltage differential would be indicated by the meter 12 and would be insufficient to actuate the relay actuator or solenoid 13 so that as illustrated, the switches 16 and 17 would remain open.

On the other hand, if the starting electrode 6 does not make a good electrical contact with the solid pieces or scrap, the voltage on the ground 14 will increase so that the voltage difference increases and this would be indicated on the meter 12 and would actuate the actuator 13 of the relay, closing the switches 16 and 17. These switches can be used to control the power going to the furnace so as to switch off this power immediately if necessary, thus protecting the starting electrode 6 against damage due to it forming an arc with the charge. If only the meter 12 is used, it would be possible to apply greater contact pressure on the starting electrode 6 or manually shut off the power to the furnace.

After the melt builds up to form a pool of adequate height, it contacts the melt contact 7 with the power automatically commutating from the starting electrode 6 to the melt electrode 7, as is schematically illustrated by FIG. 1. If there is enough melt to make a good electrical contact with the melt electrode, in this case also what might be called a normal voltage differential exists between the ground 14 and the positive power line and with proper design the relay will not be actuated, the switches 16 and 17 again remaining open. In this case the voltage drop at 4 and 11, the previously explained resistances shown schematically, determine the voltage differential.

In this case, if the melt 1 does not make an adequate contact or connection with the melt electrode 7, the voltage on the ground 14 increases above what can be called a normal value, the differential being indicated by the meter 12 again and also the relay actuator 13 being actuated with the switches 16 and 17 being used as described before. If only the meter 12 is used, it would indicate the advisability of quickly returning the starting electrode 6 to its operative position or, if the indication of an excessive voltage differential is indicated by the meter 12 during deslagging, the furnace can be promptly returned to its upright position.

It can be seen from the foregoing that without the addition of an expensive or complicated system to the elements inherently involved by a DC arc furnace, protection against inadvertent arcing between either the starting electrode or the melt electrode can be detected as by the meter 12 and used as a control as by using the previously described relay to shut off the furnace power. The cost of replacing the starting electrode or, of greater importance, the refractory encasement of the melt electrode, which may be a part of the hearth lining itself, is very great when compared to the cost of the parts required to practice the present invention.

Before closing, attention is called to the fact that it is possible that more than the single arcing electrode may be used and more than the single melt electrode may also be used. This also applies to the starting electrode 6, although normally one can be considered to be sufficient. Also, it is to be understood, if not mentioned before, that the usual hearth refractory indicated at 2 does acquire at least a low degree of conductivity under the operating conditions of the furnace when the refractory is any of those usually used to build an electric arc furnace hearth.

What is claimed is:

1. A DC arc furnace comprising a hearth having an outside and an inside adapted to contain pieces of solid metal and a melt formed therefrom, at least one arcing electrode adapted to form an arc with said pieces and said melt, at least one melt electrode adapted for melt contact by said melt, a starting electrode adapted to be moved into contact with said pieces to form said melt to a degree effecting said melt contact and to thereafter be moved away from said contact with the pieces, and positive and negative power lines of which the positive line connects with said melt and starting electrodes and the negative line connects with said arcing electrode, whereby a voltage differential is formed between the hearth's said outside and said positive line and which differential is dependent in value on the degree said starting and/or melt contact electrodes form good electric connections with said pieces and said melt respectively, and means for measuring said value.

2. The furnace of claim 1 in which said means actuates a means for controlling an electric current.

3. The furnace of claim 1 in which said means is an electric relay connected between said positive line and the hearth's said outside and which is actuated by said value exceeding a value that is normal when at least said melt electrode is in good electric connection with said melt, said relay being adapted to control said power lines.

4. The furnace of claim 1 in which the hearth's said outside is encased by a metal shell and said voltage differential is thereby formed between said shell and said positive line.

* * * * *